United States Patent [19]
Owen

[11] Patent Number: 5,615,924
[45] Date of Patent: Apr. 1, 1997

[54] WINDSHIELD COVERING SYSTEM

[76] Inventor: Richard D. Owen, 46 Mountain Dr., Pocatello, Id. 83204

[21] Appl. No.: 618,166

[22] Filed: Mar. 19, 1996

[51] Int. Cl.$^6$ ........................................................ B60J 3/02
[52] U.S. Cl. ....................................... 296/95.1; 160/370.22
[58] Field of Search ................................... 296/95.1, 97.7, 296/97.8; 160/370.22

[56] References Cited

U.S. PATENT DOCUMENTS

| | | | |
|---|---|---|---|
| 2,851,303 | 9/1958 | McQueen | 296/95.1 |
| 3,454,300 | 7/1969 | Pugsley et al. | 296/95.1 |
| 4,442,881 | 4/1984 | Minteath et al. | 296/95.1 X |
| 4,736,980 | 4/1988 | Eubanks | 296/97.7 X |
| 4,903,748 | 2/1990 | Foraker | 296/95.1 X |
| 4,921,299 | 5/1990 | Herrick | 296/97.8 |

Primary Examiner—Joseph D. Pape

[57] ABSTRACT

A windshield covering system including a covering that has a first end, a second end and an interior surface that is capable of lying adjacent to an exterior surface of a windshield. A retaining rod that has the first end of the covering attached. Included is a roller mechanism that has an axle rod. The axle rod is positioned through the roller mechanism and has an internal spring attached. The roller mechanism has the second end of the covering attached. Provided is a housing for the roller mechanism that has a top arm and a lower recoil spring. Also, a slot is positioned through the housing. The slot is capable of receiving the second end of the covering for attaching to the roller mechanism. Lastly, the cover is capable of winding around the roller mechanism when contained within the housing and in a closed position. The cover is capable of passing over the exterior of the windshield and two A-pillars of a vehicle frame to wrap completely around the frame for positioning within the interior of the vehicle.

9 Claims, 3 Drawing Sheets

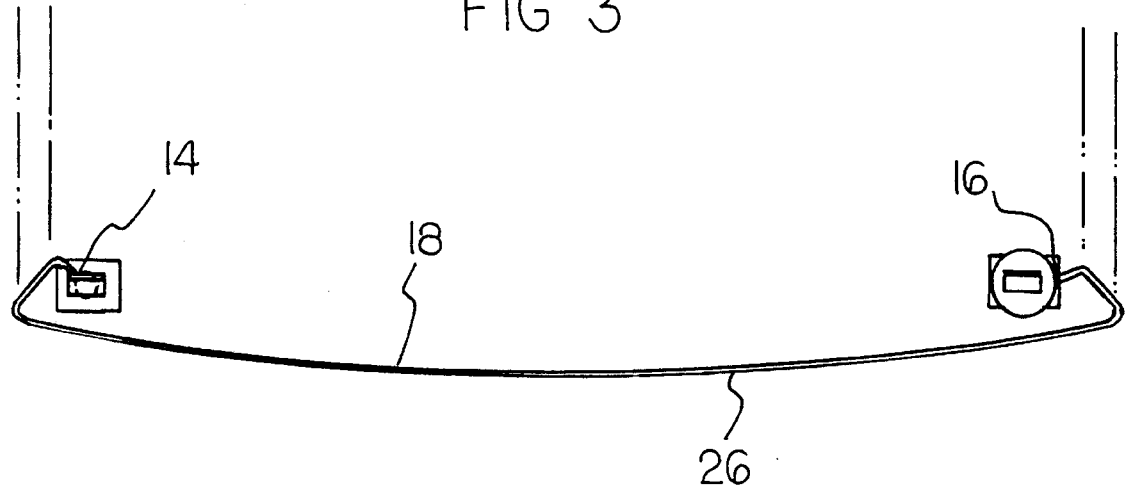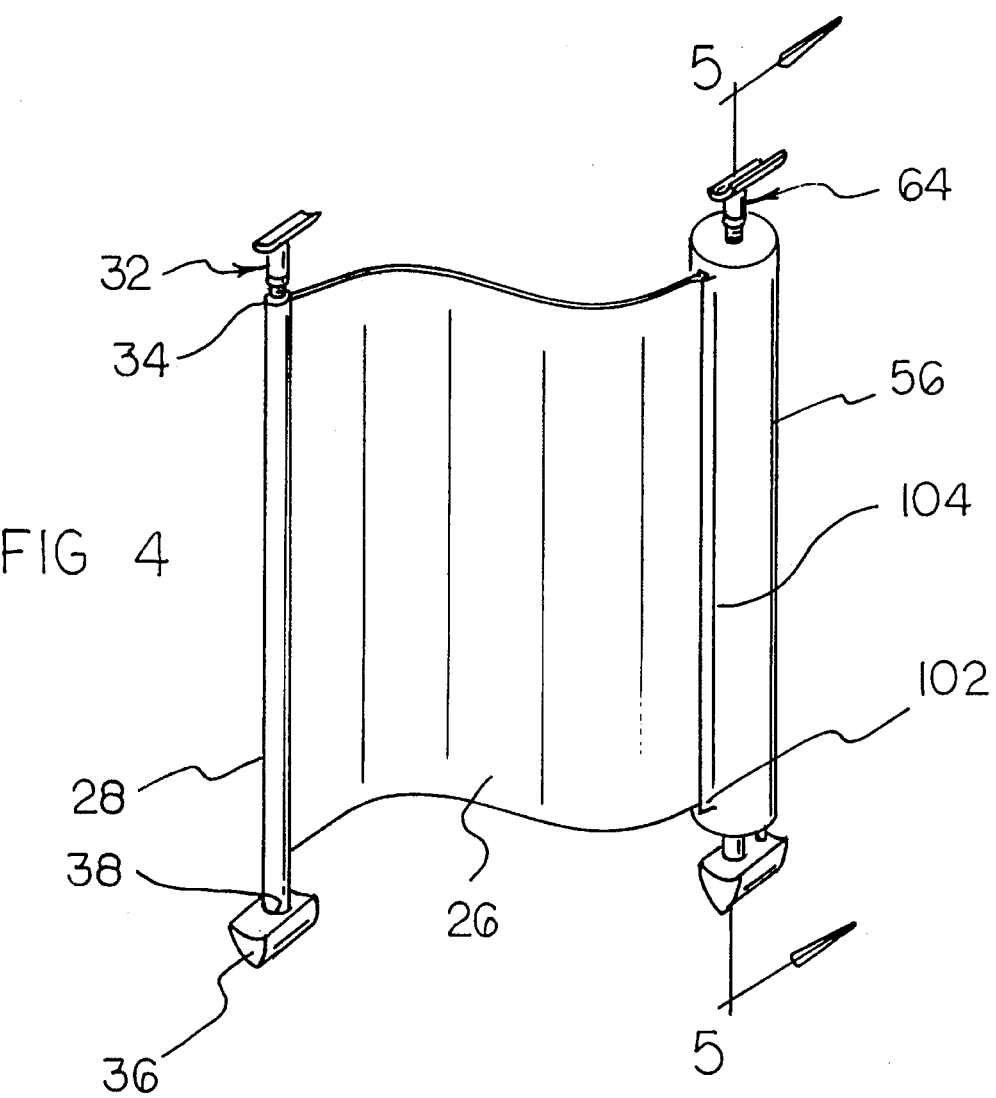

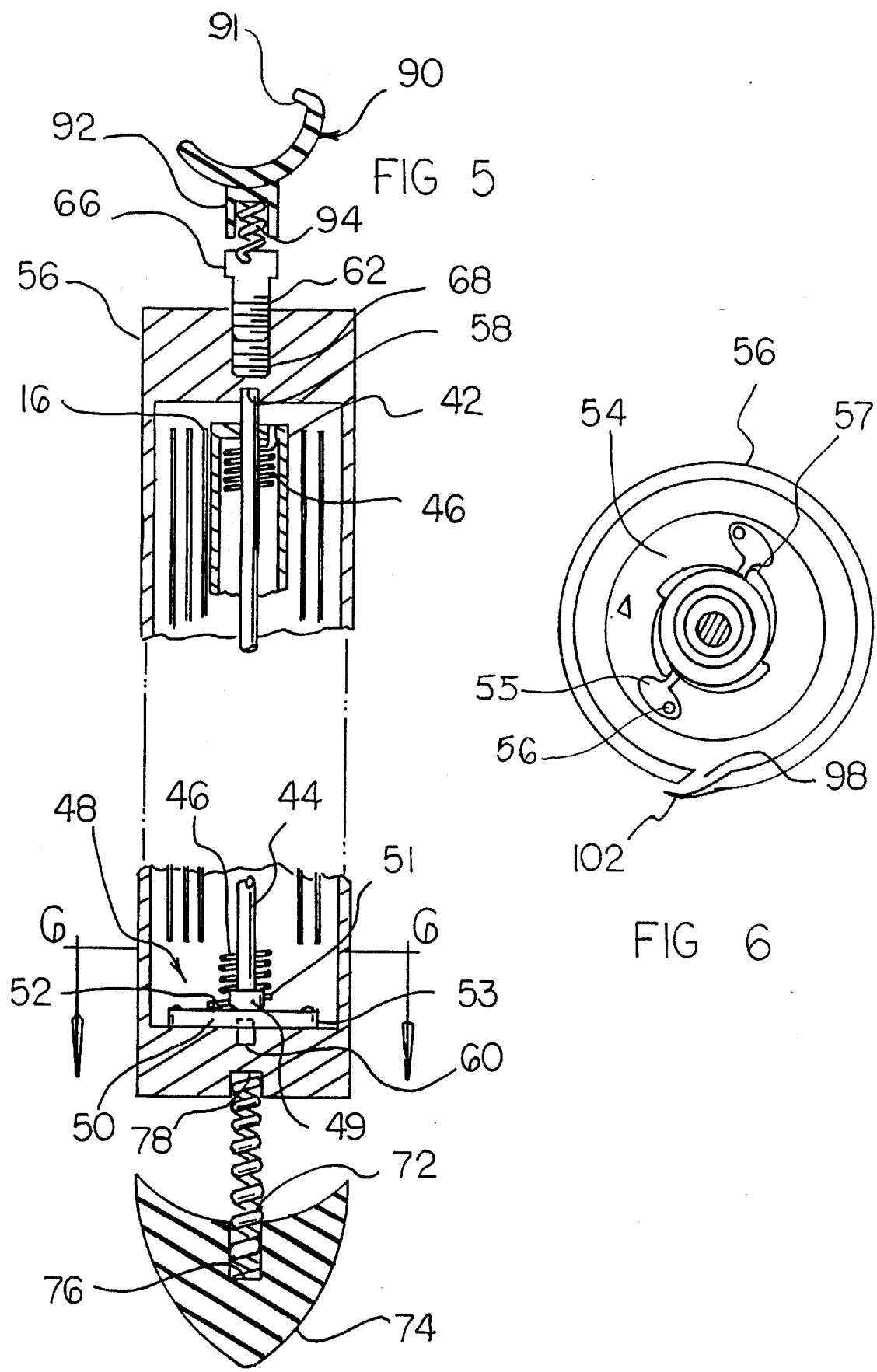

WINDSHIELD COVERING SYSTEM

BACKGROUND OF THE INVENTION

1. Field of the Invention

The present invention relates to a windshield covering system and more particularly pertains to allowing a windshield cover to be positioned exterior and adjacent the windshield of the vehicle, and further securing the cover within the interior of the vehicle between the windshield and dashboard.

2. Description of the Prior Art

The use of windshield covers is known in the prior art. More specifically, windshield covers heretofore devised and utilized for the purpose of protecting the vehicle's interior from sunlight are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,356,191 to Sheehan discloses a protective cover for the windshield of an automobile. U.S. Pat. No. 5,324,090 to Lehnhoff discloses a windshield cover for motor vehicles. U.S. Pat. No. 5,211,438 to Snow discloses a self-anchoring windshield cover. U.S. Pat. No. Des. 298,615 to Chidnuma discloses an automobile windshield cover. Lastly, U.S. Pat. No. Des. 310,195 to Ruimi discloses a windshield cover.

While these devices fulfill their respective, particular objectives and requirements, the aforementioned patents do not describe windshield covering system that allows the windshield covering to be mounted inside the vehicle near the side A-pillar of the frame and pulled from within, to extend over the exterior of the windshield and be positioned within the vehicle.

In this respect, the windshield covering system according to the present invention substantially departs from the conventional concepts and designs of the prior art, and in doing so provides an apparatus primarily developed for the purpose of allowing a windshield cover to be positioned exterior and adjacent the windshield of the vehicle, and further securing the cover within the interior of the vehicle between the windshield and dashboard.

Therefore, it can be appreciated that there exists a continuing need for a new and improved windshield covering system which can be used for allowing a windshield cover to be positioned exterior and adjacent the windshield of the vehicle, and further securing the cover within the interior of the vehicle between the windshield and dashboard. In this regard, the present invention substantially fulfills this need.

SUMMARY OF THE INVENTION

In view of the foregoing disadvantages inherent in the known types of windshield covers now present in the prior art, the present invention provides an improved windshield covering system. As such, the general purpose of the present invention, which will be described subsequently in greater detail, is to provide a new and improved windshield covering system and method which has all the advantages of the prior art and none of the disadvantages.

To attain this, the present invention essentially comprises an elongated flexible covering that has a first end, a second end and an interior surface. The interior surface of the covering is capable of lying adjacent to and covering an exterior surface of a windshield. A retaining rod is included. The retaining rod has the first end of the covering fixedly attached. The retaining rod has a coupler at one end and a tip member another end. Included is a cylindrical roller mechanism that has an axle rod projecting from the roller mechanism. The axle rod is positioned through the roller mechanism and has an internal spring around a portion of the rod and attached. The spring wraps around that portion of the rod that is contained within the roller mechanism. The roller mechanism has the second end of the covering attached. Additionally, a cylindrical housing for the roller mechanism is provided. The roller mechanism has a top end of the axle that is rotatably attached within the housing. The housing has a top arm and a coupler at one end and threadedly attached within the housing at another end. The housing has a lower recoil spring that has a tip member at one end and is fixedly attached within the housing at another end. The coupler of the retaining rod and the coupler of the housing each have a head member that is supported by a hollow base. The base has a recoil spring positioned therein for height adjustment. An elongated slot is positioned through the housing and extends about 90 percent of the length of the housing. The slot is capable of receiving the second end of the covering for attaching to the roller mechanism within the housing. The slot has an ice scrapping member projecting from a vertical edge. Lastly, the covering is capable of winding around the roller mechanism that is contained within the housing, when in a closed position. The covering is passed over the exterior of the windshield and two A-pillars of a vehicle frame. The covering is capable of wrapping completely around the two A-pillars for positioning of the retaining rod and the housing within the interior of the vehicle. The covering, in use, allows each tip end to be positioned between the dashboard and an interior surface of the windshield. While each tip end is positioned between a dashboard, each coupler is positioned adjacent an upper interior frame member of the windshield.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved windshield covering system which has all of the advantages of the prior art windshield covers and none of the disadvantages.

It is another object of the present invention to provide a new and improved windshield covering system which may be easily and efficiently manufactured and marketed.

It is further object of the present invention to provide a new and improved windshield covering system which is of durable and reliable constructions.

An even further object of the present invention is to provide a new and improved windshield covering system which is susceptible of a low cost of manufacture with regard to both materials and labor, and which accordingly is then susceptible of low prices of sale to the consuming public, thereby making such windshield covering system economically available to the buying public.

Still yet another object of the present invention is to provide a new and improved windshield covering system which provides in the apparatuses and methods of the prior art some of the advantages thereof, while simultaneously overcoming some of the disadvantages normally associated therewith.

Even still another object of the present invention is to provide a windshield covering system for allowing a windshield cover to be positioned exterior and adjacent the windshield of the vehicle, and further securing the cover within the interior of the vehicle between the windshield and dashboard.

Lastly, it is an object of the present invention to provide a new and improved windshield covering system including a covering that has a first end, a second end and an interior surface that is capable of lying adjacent to an exterior surface of a windshield. A retaining rod that has the first end of the covering attached. Included is a roller mechanism that has an axle rod. The axle rod is positioned through the roller mechanism and has an internal spring attached. The roller mechanism has the second end of the covering attached. Provided is a housing for the roller mechanism that has a top arm and a lower recoil spring. Also, a slot is positioned through the housing. The slot is capable of receiving the second end of the covering for attaching to the roller mechanism. Lastly, the cover is capable of winding around the roller mechanism when contained within the housing and in a closed position. The cover is capable of passing over the exterior of the windshield and two A-pillars of a vehicle frame to wrap completely around the frame for positioning within the interior of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top plan fragmentary view of the present invention in an operable configuration.

FIG. 4 is an isometric view of the present invention of FIG. 1.

FIG. 5 is a cross sectional view of the present invention taken along line 5—5 of FIG. 4.

FIG. 6 is an elevated cross sectional view of the present invention taken along line 6—6 of FIG. 5.

The same reference numerals refer to the same parts through the various Figures.

DESCRIPTION OF THE PREFERRED EMBODIMENT

Figure 1:
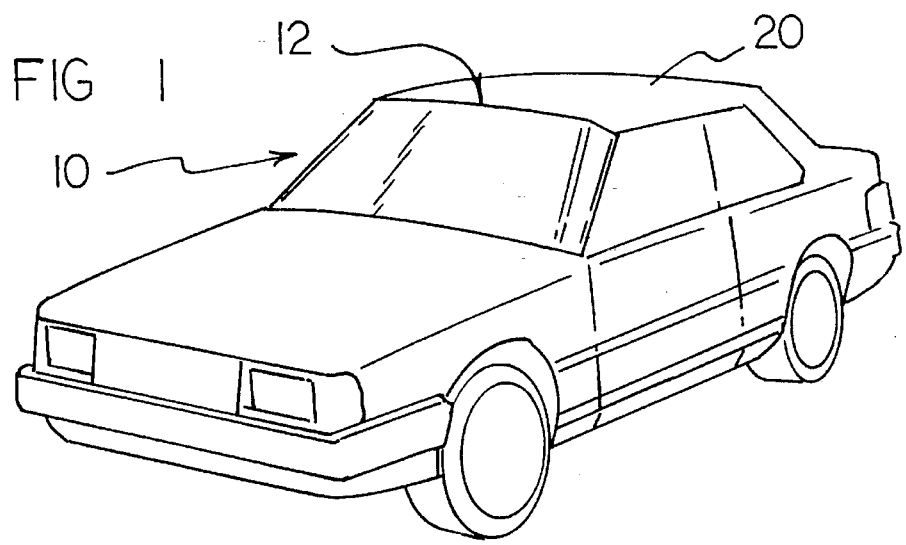
FIG. 1 is a perspective view of the preferred embodiment of the windshield covering system constructed in accordance with the principles of the present invention.

With reference now to the drawings, and in particular to FIG. 1 thereof, the preferred embodiment of the new and improved windshield covering system embodying the principles and concepts of the present invention and generally designated by the reference numeral 10 will be described.

The present invention, the windshield covering system 10 is comprised of a plurality of components. Such components in their broadest context include a cover, a roller mechanism, a retaining rod and a housing. Such components are individually configured and correlated with respect to each other so as to attain the desired objective.

Figure 2:
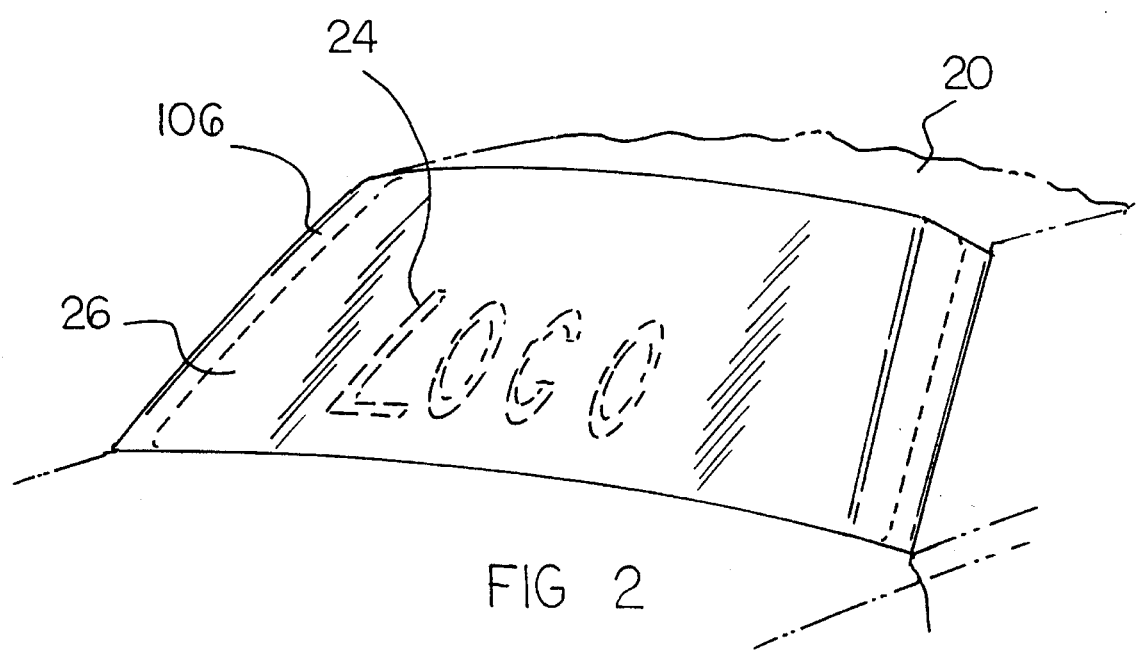
FIG. 2 is an enlarged view of the present invention of Figure with indicia thereon.

Specifically, the present invention includes an elongated flexible covering 12 formed of a waterproof fabric or plastic. As shown in FIG. 3, the covering has a first end 14, a second end 16 and an interior surface 18. As illustrated in FIG. 1, the covering lies adjacent to and covers an exterior surface of a windshield on a vehicle 20. FIG. 2 shows the covering with indicia 24. The indicia may be a company logo, company name or company advertisement on the exterior surface 26 of the covering.

As best illustrated in FIG. 4, a retaining rod 28 is provided. The retaining rod has the first end 14 of the covering fixedly attached. The retaining rod has a coupler 32 at one end 34 and a tip member 36 another end 38. The retaining rod is formed of wood or lightweight plastic. The first end of the covering is attached to the retaining rod with an adhesive that permanently bonds the first end to the retaining rod.

Also, included is a cylindrical roller mechanism 42. The roller mechanism has an axle rod 44 positioned therethrough and projecting slightly at one end from the roller mechanism, as seen in FIG. 5. The axle rod is rigid and formed of a metal, metal alloy or rigid plastic. The axle rod is positioned through the roller mechanism and has an internal spring 46 around a portion of the axle rod and attached to the axle rod. The internal spring wraps around that portion of the axle rod that is contained within the roller mechanism. The roller mechanism has the second end of the covering 12 fixedly attached to the periphery wall of the mechanism.

Additionally, a retrack mechanism 48 is coupled to the axle rod 44 at the bottom end. The retrack mechanism has a cup 49 for receiving the axle rod therein. The axle rod is fixedly coupled within the cup. The cup is fixedly attached to a base 50 of the retrack mechanism. The cup has a pair of clips 51 projecting from opposite sides thereof, only one clip is shown in FIG. 5. Each clip passes through the internal spring. The base has a generally triangular spring catch 52 that projects upwardly from the base and adjacent a peripheral wall 53 of the base. The catch is interconnected to the base. The clips and the spring catch couple the internal spring to the retrack mechanism.

As illustrated in FIG. 6, the base has an underside 54 with a pair of catches 55 coupled thereto. Each catch is rotatably coupled to the base with a pin 56. The pin allows the catch to rotate back and forth about the pin. Each catch is capable of engaging a ratchet member 57 that is coupled to the base. The retrack mechanism allows the internal spring 46 to be coiled tightly about the axle rod when the cover is pulled away from the periphery wall of the roller mechanism. The engagement of the catch and ratchet member will cause the tightened spring to locked in position. The retrack mechanism allows the tightened spring to later uncoil, when the catch becomes disengaged from the ratchet member.

A cylindrical housing 56 is provided and houses the roller mechanism 42 and the retrack mechanism 48. The axle rod of the roller mechanism has top end 58 that is rotatably attached within the housing at one end. The retrack mechanism has a flat support rod 60 fixedly positioned within the housing at an opposite end. The housing is formed of a lightweight plastic that may have its colors matching the colors of the covering. The housing has a top arm 62 that has a coupler 64 at one end 66, and is threadedly attached within the housing at another end 68. The housing has a recoil spring 72 that is inserted into a tip member 74 at one end 76 and is positioned within the housing at another end 78. The recoil spring allows the tip member to move up and down with respect to the cylindrical housing.

The coupler 32 of the retaining rod and the coupler 64 of the housing, each have a head member 90, as shown in FIG. 5. Each head member is concave and has a clasping upper tip 91 for positioning between the head liner and the windshield. Each head member is supported by a hollow base 92, as shown in FIG. 5. Each base has a recoil spring 94 positioned therein. The recoil spring of each base allows the coupler of the housing and the retaining rod to move up and down for height adjustment. When positioning the covering within the interior of the vehicle, height adjustment may be necessary and each coupler is capable of being adjusted.

The tip member 36 of the retaining rod and the tip member 74 of the lower recoil spring, are each formed of the same rubber material. As shown in FIG. 5, the tip member has a arrow-like cross section. Each tip member is compressible as needed for positioning of the covering in the interior of the vehicle.

Lastly, an elongated slot 98 is positioned through the housing 56 and extends about 90 percent of a length of the housing. The slot receives the second end 16 of the covering 12 therethrough for attaching to the roller mechanism 42 within the housing. The slot has an ice scrapping member 102 that projects from a vertical edge 104.

Furthermore, the covering 12 is wound around the roller mechanism contained within the housing 56, when in a closed position. The covering may be passed over the exterior of the windshield and two A-pillars 106 of a vehicle frame, as shown in FIG. 2. The covering is capable of wrapping completely around the two A-pillars, with positioning of the retaining rod 28 and the housing 56 within the interior of the vehicle 20. The covering in use, allows each tip end to be positioned between the dashboard and an interior surface of the windshield. While each tip end is positioned between the dashboard and window, each coupler is positioned adjacent an upper interior frame member of the windshield.

To retract the covering into the housing, pull the covering at the retaining rod. Pulling the covering disengages the catch from the ratchet member of the retrack mechanism. Also, pulling the covering causes the internal spring 46 to become untightened and will rewind the covering within the cylindrical housing. If the covering has any ice built-up thereon, the ice scrapping member 102 will remove the ice form the exterior surface of the covering as the covering is rewound.

The present invention is a windshield covering system that will protect the interior of the vehicle from sunlight. The present invention, when in position over the windshield, will lower the temperature of the interior of the vehicle by blocking the sun's rays throughout the windshield. The covering, also makes it easy to remove snow and ice from the exterior of the windshield. The present invention is structure to be mounted inside the vehicle, near each side A-pillar frame of the windshield. The tip end of the invention will fit snugly between the dashboard and the interior of the windshield, while the couplers will be secured to the interior frame between the windshield and the headliner. The covering has a first end and a second end.

The first end of the covering is attached to a retainer rod, and the second end of the covering is attached to a roller mechanism. The roller mechanism has a cylindrical housing therearound. The roller mechanism used in the present invention operates like many commercially available rolling mechanisms used in window shades. The couplers of the present invention are unique in structure in that each coupler has a head portion seated on a hollow base. The hollow base has a recoil spring that is positioned between the base and the arm attachment of either the retainer rod or the housing. The recoil spring allows the coupler to be adjusted for an exact fit of the invention between the windshield and the dashboard.

In use, the covering is rolled out of the housing, and taken outside through the nearby open car door, across the windshield and inside the opposite car door. Once the covering system is mounted in between the windshield and the dashboard, the car doors may be closed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved windshield covering system for protecting an interior of the vehicle and the windshield exterior comprising in combination:

an elongated flexible covering having a first end, a second end and an interior surface being capable of lying adjacent to and covering an exterior surface of a windshield;

a retaining rod having the first end of the covering being fixedly attached thereto, the retaining rod having a coupler at one end and a tip member at another end;

a cylindrical roller mechanism having an axle rod therein and projecting from the roller mechanism, the axle rod being positionable through the roller mechanism and having an internal spring around a portion of the rod and attached thereto, the internal spring wrapping around that portion of the rod being contained within the roller mechanism, the roller mechanism having the second end of the covering attached thereto;

a cylindrical housing for the roller mechanism with a top end of the axle rod being rotatably attached within the housing, another end of the axle rod being fixedly attached to another end of the housing, the housing having a top arm having a coupler at one end and threadedly attached within the housing at another end, the housing having a lower recoil spring being inserted within a tip member at one end and within the housing at another end;

the coupler of the retaining rod and the coupler of the housing each having a head member being supported by a hollow base, each base having a recoil spring positioned within the base for height adjustment;

an elongated slot being positioned through the housing and extending about 90 percent of a length of the housing, the slot being capable of receiving the second end of the covering therethrough for attaching to the roller mechanism within the housing, the slot having an ice scraping member projecting from a vertical edge thereof; and the covering capable of being wound around the roller mechanism being contained within the housing when in a closed position, the covering capable of being passed over the exterior of the windshield and two A-pillars of a vehicle frame, the covering being capable of wrapping completely around the two A-pillars for positioning of the retaining rod and housing within the interior of the vehicle, the covering being in use allows each tip end to be positioned between the dashboard and an interior surface of the windshield, while each coupler being positioned adjacent an upper interior frame member of the windshield.

2. The windshield covering system comprising:

a covering having a first end, a second end and an interior surface being capable of lying adjacent to an exterior surface of a windshield;

a retaining rod having the first end of the covering being attached thereto;

a roller mechanism having an axle rod being position through the roller mechanism and having an internal spring attached thereto, the roller mechanism having a second of the covering attached thereto;

a housing for the roller mechanism having a top arm and a lower recoil spring;

an slot being positioned through the housing, the slot being capable of receiving the second end of the covering therethrough for attaching to the roller mechanism; and the covering capable of being wound around the roller mechanism when contained within the housing and in a closed position, the covering capable of being passed over the exterior of the windshield and two A-pillars of a vehicle frame to wrap completely therearound for positioning within the interior of the vehicle.

3. The windshield covering system as set forth in claim 2 wherein the covering being fixedly attached to the first end of the retaining rod, and the retaining rod having a coupler at one end and a tip member at another end.

4. The windshield covering system as set forth in claim 3 wherein the coupler of the retaining rod having a head member being supported by a hollow base, the base having a recoil spring positioned within the base for height adjustment, and the tip member being flexible.

5. The windshield covering system as set forth in claim 4 wherein the axle rod projects from the roller mechanism and having a top end being rotatably attached within the housing, and the axle rod being fixedly attached at another end of the housing, and the spring wrapping around that portion of the rod being contained within the roller mechanism.

6. The windshield covering system as set forth in claim 5 wherein the top arm of the housing having two ends, one end having a coupler and another end being threadedly attached within the housing, and the lower recoil spring having two ends, one end positioned within a tip member and another end positioned within the housing.

7. The windshield covering system as set forth in claim 6 wherein the coupler of the housing having a head member being supported by a hollow base, the base having a recoil spring positioned within the base for height adjustment and the tip member being flexible.

8. The windshield covering system as set forth in claim 7 wherein the slot of the housing extends about 90 percent of a length of the housing and having an ice scraping member projecting from a vertical edge thereof.

9. The windshield covering system as set forth in claim 8 wherein the cover being in use allows the tip end of the retaining rod and the housing to be positioned between the dashboard and an interior surface of the windshield, while the coupler of the retaining rod and the housing being positioned adjacent an upper interior frame member of the windshield for supporting the covering system interior the vehicle.

* * * * *